(12) United States Patent
Yamauchi et al.

(10) Patent No.: US 8,044,602 B2
(45) Date of Patent: Oct. 25, 2011

(54) METHOD OF DRIVING DISCHARGE LAMP, DRIVING DEVICE, AND PROJECTOR

(75) Inventors: Kentaro Yamauchi, Ashiya (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 452 days.

(21) Appl. No.: 12/372,370

(22) Filed: Feb. 17, 2009

(65) Prior Publication Data

US 2009/0207385 A1      Aug. 20, 2009

(30) Foreign Application Priority Data

Feb. 19, 2008   (JP) .................. 2008-036973

(51) Int. Cl.
   *H05B 37/02* (2006.01)
(52) U.S. Cl. ........................ 315/224; 315/307
(58) Field of Classification Search .............. 315/209 R, 315/291, 224, 225, 307, 308
   See application file for complete search history.

(56) References Cited

U.S. PATENT DOCUMENTS

| | | | |
|---|---|---|---|
| 7,274,157 B2 | 9/2007 | Hirata et al. | |
| 7,377,670 B2 | 5/2008 | Takezawa | |
| 7,615,941 B2 * | 11/2009 | Blumel | 315/309 |
| 7,622,869 B2 | 11/2009 | Watanabe et al. | |
| 7,786,682 B2 * | 8/2010 | Ikeda et al. | 315/291 |
| 7,923,940 B2 * | 4/2011 | Okawa | 315/224 |

FOREIGN PATENT DOCUMENTS

| | | |
|---|---|---|
| JP | B2-3201981 | 8/2001 |
| JP | A-2005-38815 | 2/2005 |
| JP | A-2006-32017 | 2/2006 |
| JP | B2-3840054 | 11/2006 |
| JP | A-2008-191449 | 8/2008 |
| WO | WO 2004/086453 A1 | 10/2004 |

* cited by examiner

*Primary Examiner* — Don Le
(74) *Attorney, Agent, or Firm* — Oliff & Berridge, PLC (57) ABSTRACT

A method for driving a discharge lamp that supplies an AC current to a discharge lamp having a first electrode and a second electrode so as to produce discharge and to cause the discharge lamp to emit light includes, during a steady operation in which the AC current is supplied to the discharge lamp, changing a difference between the absolute values of average current values for two polarities during one cycle of the AC current in accordance with a predetermined pattern.

13 Claims, 10 Drawing Sheets

METHOD OF DRIVING DISCHARGE LAMP, DRIVING DEVICE, AND PROJECTOR

BACKGROUND

1. Technical Field

The present invention relates to a method for driving a discharge lamp having a pair of electrodes, a driving device, and a projector including a light source incorporated with such a discharge lamp.

2. Related Art

The state of a discharge emission-type lamp changes in accordance with an operating time, and in particular, electrodes wear off while the lamp is being lighted and the shapes thereof change as time passes. For example, if a plurality of protrusions are grown from the tip portions of the electrodes, and the body portions of the electrodes wear off irregularly, the start point of arc may be moved or the arc length may be changed. For this reason, the luminance of a light source device and a projector may be deteriorated and the lifespan of the discharge lamp may be shortened.

As a method of coping with the wearing-off of the body portions of the electrodes, a technology is known in which a lighting current equal to or more than a rated current value is supplied while the discharge lamp is being lighted in a steady-state, thereby restoring the shapes of the worn tip portions of the electrodes (see Japanese Patent No. 3840054).

However, in a method of restoring the surface of each electrode, which is worn off, by temporarily increasing a current value, the tip portion of the electrode is temporarily completely melted, and the arc length temporarily rapidly increases. For this reason, illumination may be deteriorated, and flicker and color irregularity may occur.

SUMMARY

An advantage of some aspects of the invention is that it provides a method for driving a discharge lamp, which is capable of suppressing occurrence of the above-described problems, preventing a plurality of protrusions from being grown in tip portions of electrodes or preventing body portions of electrodes from wearing off unevenly, and extending lifespan of a light source, such a driving device, and a projector using the same.

According to an aspect of the invention, there is provided a method for driving a discharge lamp that supplies an AC current to a discharge lamp having a first electrode and a second electrode so as to produce discharge and to cause the discharge lamp to emit light. The method includes, during a steady operation in which the AC current is supplied to the discharge lamp, changing a difference between the absolute values of current values for two polarities during one cycle of the AC current in accordance with a predetermined pattern.

With this driving method, during the steady operation, the difference between the absolute values of the current values for the two polarities during one cycle of the AC current is changed in accordance with the predetermined pattern. For this reason, even if the AC current whose polarity alternates is basically used, a balance between a current value when the first electrode serves as an anode and a current value when the second electrode serves as an anode can be appropriately changed. Therefore, a single large protrusion can be reliably maintained or grown while the tip portions of both electrodes are appropriately melted alternately. As a result, both electrodes can be prevented from being deteriorated, and thus the lifespan of the light source can be extended.

According to a specific example of the invention, a period of one cycle of the predetermined pattern may correspond to a period of a plurality of cycles of the AC current, during one cycle of the predetermined pattern, the difference between the absolute values of average current values during half cycle for the two polarities may increase or decrease, and the difference between the absolute values of the average current values during half cycle for the two polarities may be cyclically changed by repetition of the predetermined pattern. In this case, the thermal states of both electrodes and the periphery thereof can be significantly slowly changed on a comparatively long time scale. Therefore, steady convection can be avoided from being formed in the light-emitting tube. As a result, both electrodes can be prevented from wearing off unevenly or an electrode material can be prevented from being precipitated unevenly.

According to another example of the invention, in a situation where a tip portion of the first electrode becomes higher than a tip portion of the second electrode in temperature, the maximum value of the absolute value of the current when the first electrode serves as an anode may be set so as to be smaller than the maximum value of the absolute value of the current value when the second electrode serves as an anode. In this case, the first electrode can be prevented from being liable to be higher than the second electrode in temperature, and thus the first electrode can be prevented from being deteriorated earlier than the second electrode. As a result, the illuminance of illumination light from the light source device can be maintained, and the lifespan of the light source device can be extended.

According to another example of the invention, a primary reflecting mirror may be disposed on the second electrode side to reflect a light beam generated by discharge between the first electrode and the second electrode so as to be emitted toward a region to be illuminated, and an auxiliary reflecting mirror may be disposed on the first electrode side so as to be opposite the primary reflecting mirror to reflect a light beam from an inter-electrode space between the first electrode and the second electrode toward the inter-electrode space. In this case, the first electrode on the auxiliary reflecting mirror side can be prevented from becoming higher than the second electrode on the primary reflecting mirror side in temperature. The reason why the first electrode on the auxiliary reflecting mirror side has a comparatively high temperature is considered that the first electrode is located closer to the auxiliary reflecting mirror and is likely to be more exposed to radiation heat from the auxiliary reflecting mirror, or that cooling wind flowing around the light-emitting tube is blocked by the auxiliary reflecting mirror, and cooling efficiency is lowered on a side of the first electrode covered with the auxiliary reflecting mirror, that is, in a hemisphere in which the first electrode is accommodated.

According to yet another example of the invention, the current value of at least one polarity, at which the absolute value of the current value becomes smaller, of the two polarities during one cycle of the AC current may be changed within a corresponding polarity period. In this case, flicker can be suppressed in an electrode that is operating as a cathode, and the tip portion can be necessarily and sufficiently melted in an electrode that is operating as an anode. As a result, discharge can be stabilized and the shape of each electrode can be maintained.

According to yet another example of the invention, the current value of at least one polarity, at which the absolute value of the current value becomes smaller, of the two polarities during one cycle of the AC current may be changed such that the absolute value of the current value is maximized at the end of a corresponding polarity period. In this case, flicker can be more effectively suppressed, and since the tip portion of the electrode is melted, the shape of each electrode can be more effectively maintained.

According to a second aspect of the invention, there is provided a driving device that supplies an AC current to a discharge lamp having a first electrode and a second electrode so as to produce discharge and to cause the discharge lamp to emit light. The driving device includes a current driving circuit that, during a steady operation in which the AC current is supplied to the discharge lamp, changes a difference between the absolute values of current values for two polarities during one cycle of the AC current in accordance with a predetermined pattern.

With this driving device, during the steady operation, the difference between the absolute values of the current values for the two polarities during one cycle of the AC current is changed in accordance with the predetermined pattern. For this reason, even it the AC current whose polarity alternates is basically used, a balance between a current value when the first electrode serves as an anode and a current value when the second electrode serves as an anode can be slowly changed. Therefore, a single large protrusion can be reliably maintained or grown while the tip portions of both electrodes are appropriately melted alternately. As a result, both electrodes can be prevented from being deteriorated, and thus the lifespan of the light source can be extended.

According to a third aspect of the invention, a projector includes a light source device that is driven by the above-described driving method and emits light, a light modulation device that receives a light beam from the light source device, and a projection optical system that projects an image formed by the light modulation device.

With this projector, the above-described light source device is used. Therefore, both electrodes of the light source device can be prevented from being deteriorated. As a result, the projection luminance of the projector can be maintained over a long period.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a light source device incorporated with a driving device for a discharge lamp according to a first embodiment of the invention will be described with reference to the drawings.

Figure 1:
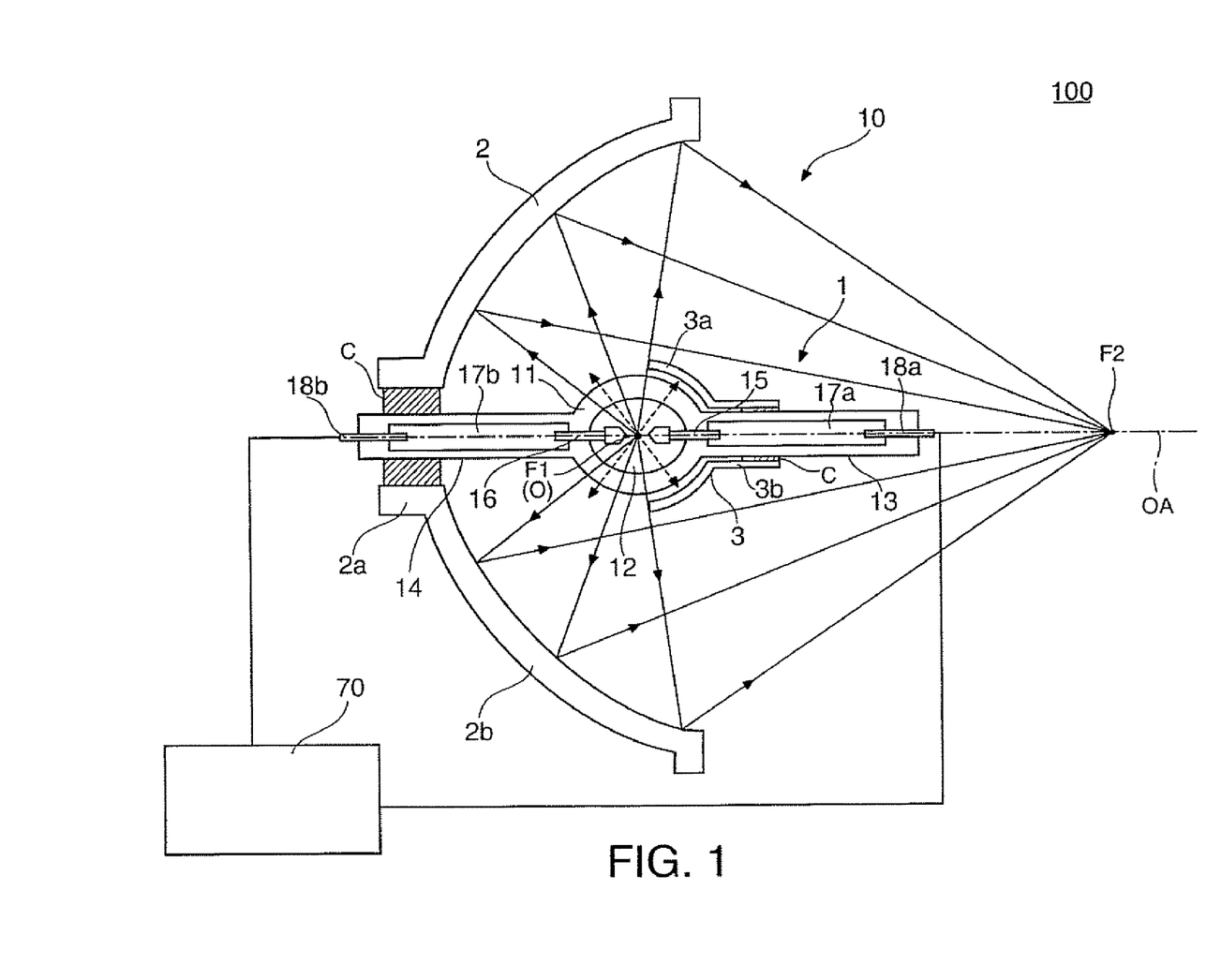
FIG. 1 is a sectional view illustrating a light source device according to a first embodiment of the invention.

FIG. 1 is a sectional view conceptually illustrating the structure of a light source device 100. In the light source device 100, a light source unit 10 includes a discharge emission-type light-emitting tube 1 serving as a discharge lamp, an elliptical reflector 2 serving as a primary reflecting mirror, and a spherical auxiliary mirror 3 serving as an auxiliary reflecting mirror. A light source driving device 70 includes, an electrical circuit, serving as a driving device for a discharge lamp, which supplies an AC current to the light source unit 10 so as to cause the light source unit 10 to emit light in a desired state.

In the light source unit 10, the light-emitting tube 1 is formed of a transmissive silica glass tube having a central portion thereof swollen spherically. The light-emitting tube 1 includes a body portion 11 that is a sealed body configured to emit light for illumination, and first and second seal portions 13 and 14 that extend along an axis passing through both ends of the body portion 11.

In a discharge space 12 formed in the body portion 11, a tip portion of a first electrode 15 made of tungsten and a tip portion of a second electrode 16 made of tungsten are disposed so as to be spaced at a predetermined distance from each other, and gas, which is a discharge medium containing rare gas and a metal halogen compound, is filled. In respective seal portions 13 and 14 extending from both ends of the body portion 11, metal foils 17a and 17b made of molybdenum are filled, respectively. The metal foils 17a and 17b are electrically connected to base portions of the first and second electrodes 15 and 16 provided in the body portion 11, respectively. The seal portions 13 and 14 are sealed airtight from the outside by a glass material. If power is supplied to lead wires 18a and 18b connected to the metal foils 17a and 17b by the light source driving device 70 in the form of AC pulses, arc discharge is generated between a pair of electrodes 15 and 16, and the body portion 11 emits light with high luminance.

The auxiliary mirror 3 is located close to the body portion 11 of the light-emitting tube 1 and covers a substantially half of the body portion 11 on a front side in a beam emission direction on which the first electrode 15 is present. The auxiliary mirror 3 is a mold product made of silica glass as a single body. The auxiliary mirror 3 includes an auxiliary reflecting portion 3a that gets the light beam emitted from the body portion 11 of the light-emitting tube 1 toward the front back to the body portion 11, and a support portion 3b that is fixed to the periphery of the first seal portion 13 in a state of supporting a base portion of the auxiliary reflecting portion 3a. The support portion 3b has the first seal portion 13 inserted therein and holds the auxiliary reflecting portion 3a in a state of being aligned with the body portion 11.

The reflector 2 is disposed so as to be opposite a substantially half of the body portion 11 of the light-emitting tube 1 on a rear side in the beam emission direction on which the second electrode 16 is present. The reflector 2 is a mold product made of crystallized glass or silica glass as a single body. The reflector 2 includes a neck portion 2a through which the second seal portion 14 of the light-emitting tube 1 is inserted, and a primary reflecting portion 2b that has an elliptically curved surface expanding from the neck portion 2a. The neck portion 2a has the second seal portion 14 inserted therein and holds the primary reflecting portion 2b in a state of being aligned with the body portion 11.

The light-emitting tube 1 is disposed along a system optical axis OA corresponding to an axis of rotational symmetry or an optical axis of the primary reflecting portion 2b such that an emission center O between the first and second electrodes 15 and 16 inside the body portion 11 becomes substantially identical to the position of a first focus F1 of the elliptically curved surface of the primary reflecting portion 2b. When the light-emitting tube 1 is lighted, light beams emitted from the arc around the emission center O of the body portion 11 are reflected by the primary reflecting portion 2b or reflected by the auxiliary reflecting portion 3a and then further reflected by the primary reflecting portion 2b, and are formed as light beams converged at the position of a second focus F2 of the elliptically curved surface. That is, the reflector 2 and the auxiliary mirror 3 have reflecting curved surfaces substantially axisymmetric with respect to the system optical axis OA, and the pair of electrodes 15 and 16 are disposed such that the electrode axis, the center of the axis thereof, becomes substantially identical to the system optical axis OA.

The light-emitting tube 1 is manufactured by a shrink seal which supports the first and second electrodes 15 and 16 individually fixed to the tips of the metal foils 17a and 17b inside a silica glass tube, and in which the silica glass tube is heated from the periphery thereof by a burner at portions corresponding to both seal portions 13 and 14, softened, and contracted. The auxiliary mirror 3 is fixed to the light-emitting tube 1 by injecting, filling, and solidifying an inorganic adhesive C in a state where the support portion 3b is inserted through the first seal portion 13 of the light-emitting tube 1. The light-emitting tube 1 is fixed to the reflector 2 by injecting, filling, and solidifying an inorganic adhesive C in a state where the second seal portion 14 is inserted into the neck portion 2a of the reflector 2.

Figure 2:
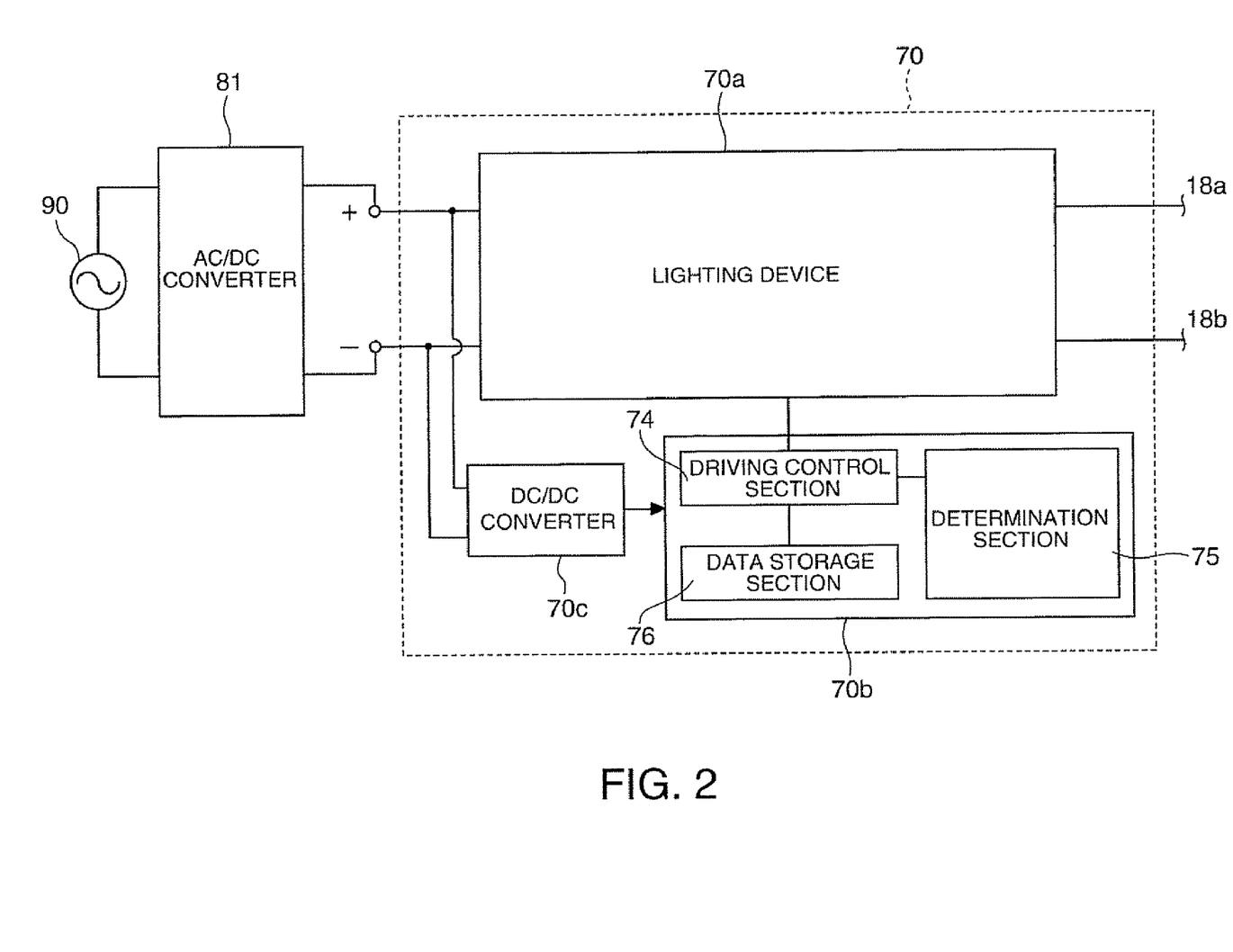
FIG. 2 is a block diagram showing the configuration of a light source driving device incorporated into a light source device.

FIG. 2 is a block diagram schematically showing the configuration of the light source driving device 70 for turning on the light source unit 10 shown in FIG. 1 in a desired state.

The light source driving device 70 generates an AC current for producing discharge between a pair of electrodes 15 and 16 shown in FIG. 1, and controls the supply state of the AC current to both electrodes 15 and 16. The light source driving device 70 includes a lighting device 70a, a control device 70b, and a DC/DC converter 70c. Here, an example where the light source driving device 70 uses an external power supply will be described. That is, the light source driving device 70 is connected to an AC/DC converter 81, and the AC/DC converter 81 is connected to a commercial power supply 90. The AC/DC converter 81 converts an AC voltage, which is supplied from the commercial power supply 90, into a DC voltage.

The lighting device 70a is a circuit that turns on the light source unit 10 shown in FIG. 1. The lighting device 70a adjusts a driving waveform output from the light source driving device 70. Here, the driving waveform has factors, such as frequency of output current or voltage, amplitude, duty ratio, ratio of positive and negative amplitudes, waveform characteristics, and the like. A driving current having an arbitrary waveform characteristic, such as a square wave, a superimposed wave obtained by superimposing a triangular wave on a square wave, or the like is output from the lighting device 70a to the light source unit 10.

The control device 70b is a circuit unit that includes a microcomputer, a memory, a sensor, an interface, and the like, and is driven by an appropriate driving voltage generated by the DC/DC converter 70c. The control device 70b includes a driving control section 74 that controls the operation state of the lighting device 70a, a determination section 75 that determinates the state of the light-emitting tube 1, and a data storage section 76 that stores various kinds of information regarding the operation mode of the lighting device 70a, that is, power feed conditions and the like.

The driving control section 74 operates in accordance with a program stored in the data storage section 76 or the like. The driving control section 74 selects one of a power feed condition for an initial operation and a power feed condition for a steady operation stored in the data storage section 76 in accordance with the current state of the light-emitting tube 1, and causes the lighting device 70a to execute the initial operation or the steady operation in accordance with the selected power feed condition. The driving control section 74 functions as a current driving circuit that feeds power to the light-emitting tube 1 to execute a necessary lighting operation, together with the lighting device 70a. In this embodiment, an operation to supply normal energy to the second electrode 16 and the first electrode 15 is called the steady operation, and an operation, different from the steady operation when lighting starts before the steady operation is executed, to supply energy to the second electrode 16 and the first electrode 15 is called the initial operation.

The determination section 75 determines a deterioration level of the light-emitting tube 1 on the basis of the state of the light-emitting tube 1, that is, a cumulative lighting time of the light-emitting tube 1, an inter-electrode voltage to the light-emitting tube 1, and the like.

The data storage section 76 stores a plurality of power feed conditions for the initial operation as the initial operation modes of the light-emitting tube 1 and a plurality of power feed conditions for the steady operation as the steady operation modes of the light-emitting tube 1, in addition to the program for the operation of the driving control section 74 and the like. Specifically, the data storage section 76 stores various parameters, such as set values of a current value and a frequency, during the initial operation, for example, when initiation or during a rising time period. The data storage section 76 also stores various parameters regarding a lighting frequency, a current value, a current displacement, a division period, a current displacement cycle, a triangular wave jump rate, and the like during the steady operation, that is, when rated driving. Here, the current displacement means a rectangular wave-like AC component having the same positive and negative amplitudes, that is, a DC component that should be superimposed on an AC component having a lighting frequency for lighting the light-emitting tube 1. Such a current displacement slowly changes a difference (a relative difference $\Delta I$ which will be described below) between the absolute value of a current when the first electrode 15 serves as an anode and the absolute value of a current value when the second electrode 16 serves as an anode in accordance with a predetermined pattern.

Figure 3:
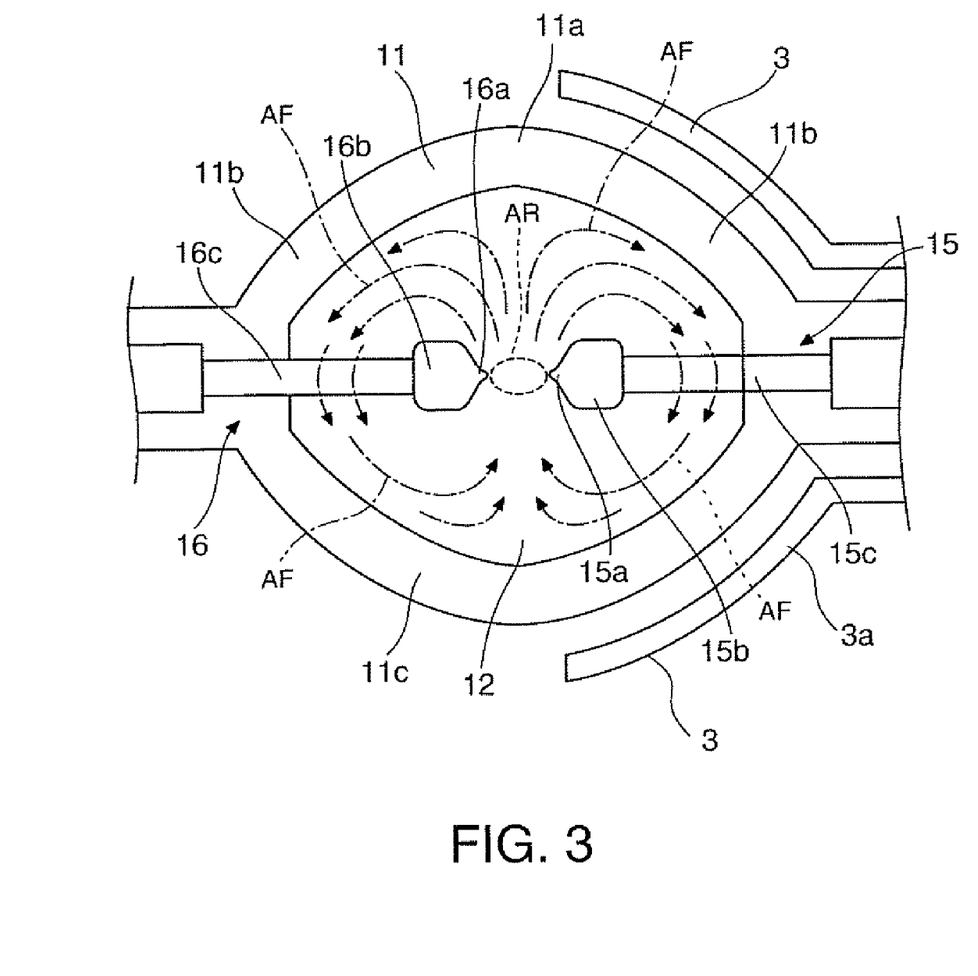
FIG. 3 is an enlarged sectional view illustrating a body portion of a light-emitting tube.
Figure 4A:
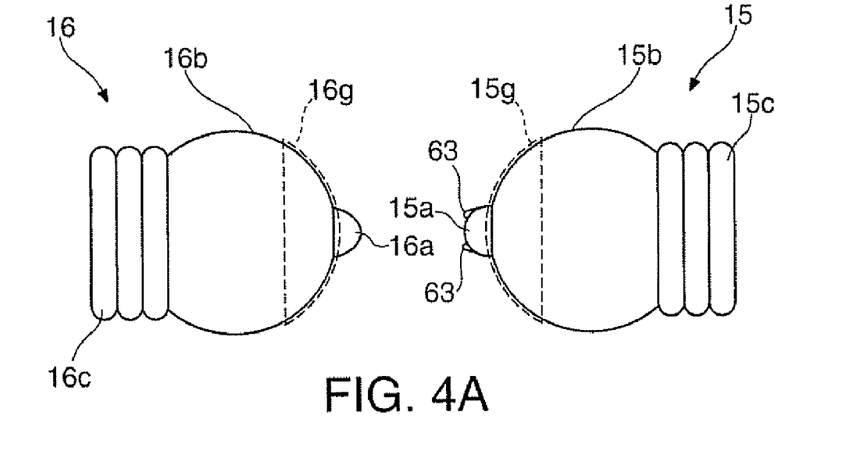
FIGS. 4A to 4C are enlarged views illustrating a repair process of electrodes by a light source driving device.
Figure 4B:
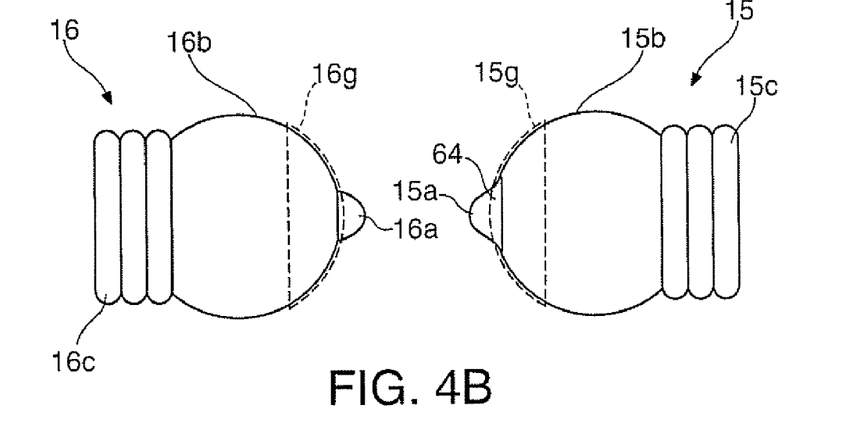
Figure 4C:
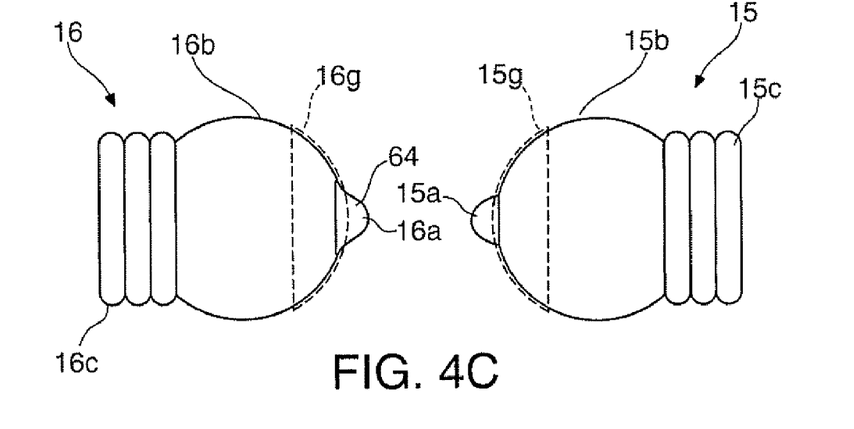

FIG. 3 is an enlarged sectional view illustrating the inside of the body portion 11 of the light-emitting tube 1 shown in FIG. 1. FIGS. 4A to 4C are conceptual views illustrating a repair process of both electrodes 15 and 16. As shown in the drawings, the first and second electrodes 15 and 16 in the body portion 11 individually includes tip portions 15a and 16a, large diameter portions 15b and 16b, and shaft portions 15c and 16c.

In the case of the first electrode 15 shown in FIG. 4A, a plurality of minute concavo-convexes 63 are formed in a surface on a tip side of the tip portion 15a. In this case, a phenomenon that a discharge start point is moved between the tip portion 15a and the concavo-convexes 63, that is, flicker or arc jump occurs. Here, flicker means a phenomenon that the discharge start point is continuously moved, and arc jump means a phenomenon that the discharge start point is completely moved from an original discharge start point. Flicker or arc jump causes display flicker or deterioration of illuminance.

It is assumed that in order to prevent flicker or arc jump after or before the fact, during the steady operation of the light-emitting tube 1, as described below in detail, the first and second electrodes 15 and 16 are alternately subject to a cyclic repair process.

In an example shown in FIG. 4B, the current value when the first electrode 15 operates as an anode is set so as to be larger than the current value when the second electrode 16 operates as an anode. When this happens, the temperature of the tip of the first electrode 15 rises, and the concavo-convexes 63 of FIG. 4A are melted, thereby forming a molten portion 64. Let a difference between the absolute value I1 of the current value when the first electrode 15 serves as an anode and the absolute value I2 of the current value when the second electrode 16 serves as an anode during one cycle be the relative difference ΔI, and the current in the first electrode 15 is shifted by half of the relative difference ΔI with respect to the normal state, that is, ΔI/2 as a whole. For this reason, by adjusting the increase ΔI/2 (hereinafter, referred to as displacement) and an increase period t, the increase in temperature of the tip of the first electrode 15 can be appropriately controlled. The adjustment of the increase in temperature of the tip of the first electrode 15 ensures that the molten portion 64 can be formed on the surface of the tip portion 15a while the tip portion 15a substantially slightly remains, and the concavo-convexes 63 can become flat. As described above, after the tip of the first electrode 15 is sufficiently heated, as shown in FIG. 4C, during one cycle, the absolute value of the current when the second electrode 16 operates as an anode is set so as to be larger than the absolute value of the current value when the first electrode 15 operates as an anode. When this happens, the temperature of the tip of the first electrode 15 falls, and the molten portion 64 of FIG. 4B is gradually cooled. The cooled molten portion 64 is solidified, and as shown in FIG. 4C, the tip portion 15a is maintained in a taper shape having an adequately large size.

In the foregoing description, repair driving has been described focusing on the first electrode 15, but for the second electrode 16, the same repair driving may be performed simultaneously. That is, in the state shown in FIG. 4C, the temperature of the tip of the second electrode 16 rises, and the molten portion 64 is formed. Next, if the state of FIG. 4C returns to the state of FIG. 4B, the temperature of the tip of the second electrode 16 falls, the cooled molten portion 64 is solidified. Thus, the shape of the tip portion 16a is maintained in a taper shape.

That is, by alternately repeating the state of FIG. 4B where the first electrode 15 serving as an anode is heated and the second electrode 16 is cooled, and the state of FIG. 4C where the second electrode 16 serving as an anode is heated and the first electrode 15 is cooled, the first and second electrodes 15 and 16 are alternately repaired. Therefore, both electrodes 15 and 16 can be prevented from being deteriorated, and the lifespan of the light-emitting tube 1 can be extended.

Returning to FIG. 3, during the steady operation in which the light-emitting tube 1 is in rated operation, an arc AR is formed between the tip portions 15a and 16a of a pair of electrodes 15 and 16 by arc discharge. The arc AR and the periphery thereof become high in temperature. For this reason, convection AF from the arc AR upward is formed in the discharge space 12. The convection AF hits a top portion 11a of the body portion 11, is moved along an upper half portion 11b thereof, passes through the shaft portions 15c and 16c of both electrodes 15 and 16, and is dropped while being cooled. The dropped convection AF is further dropped along a lower half portion 11c of the body portion 11, collides against each other below the arc AR, and rises so as to return to the arc AR upward. That is, the convection AF is formed and circulated around both electrodes 15 and 16, but the convection AF may include an electrode material melted and evaporated by the arc AR. The electrode material may be topically accumulated or segregated in the shaft portions 15c and 16c by steady convection and may be grown in the form of needle, and unintended discharge may be produced toward the upper half portion 11b. Unintended discharge causes deterioration of an inner wall of the body portion 11 and shortening of the lifespan of the light-emitting tube 1. In addition, when lighting by a single driving waveform continues for a long time, the electrodes continuously have a predetermined temperature distribution for a long time, and as a result, asymmetry of the electrodes caused by a time-variant state tends to increase as time passes. For this reason, with respect to the AC current supplied between the first and second electrodes 15 and 16, the relative difference ΔI, which corresponds to the difference between the absolute value I1 of the current value when the first electrode 15 serves as an anode and the absolute value I2 of the current value when the second electrode 16 serves as an anode, is slowly and cyclically changed in a comparatively long cycle, and the temperature distribution of the electrodes 15 and 16 is cyclically changed. Then, the electrodes are prevented from being deteriorated unevenly, a temporal change occurs in the convection due to a difference in temperature, several hundred K, between the left and right electrodes 15 and 16, and steady convection AF is prevented from being formed in the discharge space 12. Specifically, in a cycle sufficiently larger than the cycle of a current waveform having a predetermined frequency (lighting frequency) to be supplied to a pair of electrodes 15 and 16, a difference (relative difference) ΔI between the absolute values of current values for the two polarities in the corresponding current waveform is cyclically changed. For this reason, a superimposed current generated by superimposing a DC component (displacement ΔI/2) cyclically changing in a comparatively long cycle on an AC component of a lighting frequency having the same positive and negative bandwidths is supplied between both electrodes 15 and 16 such that the relative difference ΔI is realized. In this case, as the pattern for cyclically changing the displacement ΔI/2 of the current waveform, for example, a pattern in which the displacement cycle of the displacement ΔI/2 is divided into a plurality of division periods, and in each division period, the displacement ΔI/2 is maintained during a predetermined period or more is used. That is, the displacement ΔI/2 of the current waveform which is supplied to both electrodes 15 and 16 changes in a stepwise manner and cyclically increases or decreases. By adjusting the displacement ΔI/2 and the displacement cycle, the first and second electrodes 15 and 16 shown in FIGS. 4B and 4C are repaired simultaneously.

A specific driving condition will now be described. It is assumed that the lighting frequency supplied to both electrodes 15 and 16 is, for example, in a range of 60 Hz to 500 Hz. In addition, each of the division periods constituting the displacement cycle regarding the displacement ΔI/2 in the current waveform is set to be, for example, 1 second or more (in a specific example, 10 seconds), and in each division period, the displacement ΔI/2 is maintained to a predetermined value, which is 50% or less of the amplitude of the AC component of a lighting frequency. Here, if the displacement ΔI/2 is divided into, for example, 10 levels (in a specific example, 12 levels), the displacement cycle regarding the displacement ΔI/2 of all the division periods becomes, for example, 10 seconds or more (in a specific example, 120 seconds). With such a displacement pattern regarding the displacement ΔI/2, a repair process to melt and grow the tip portions 15a and 16a of the first and second electrodes 15 and 16 can be performed, and the shapes of the tip portions 15a and 16a can be maintained during a long period. Therefore, the movement of the arc start point or the change in the arc length can be suppressed, and the lifespan of both electrodes 15 and 16 can be extended. In addition, with such a displacement pattern, the thermal states of the first and second electrodes 15 and 16 and the periphery thereof can be slowly changed over such a long span that the convection AF is influenced. Therefore, steady convection AF can be avoided from being formed inside the body portion 11 of the light-emitting tube 1. As a result, the electrode material can be prevented from being grown like a needle at unintended places of both electrodes 15 and 16, and both electrodes 15 and 16 can be prevented from being deteriorated unevenly.

Hereinafter, the fact that the first electrode 15 on the auxiliary mirror 3 side becomes higher than the second electrode 16 on the reflector 2 side in temperature will be described. First, the first electrode 15 is located closer to the auxiliary mirror 3 than the second electrode 16, and accordingly, the first electrode 15 is liable to be exposed to radiation heat from the auxiliary mirror 3. For this reason, the first electrode 15 is liable to become higher than the second electrode 16 in temperature. The light source unit 10 is cooled to an adequate temperature by cooling wind from a cooling device (not shown), but cooling efficiency tends to be lowered in the hemisphere of the body portion 11 of the light-emitting tube 1 covered with the auxiliary mirror 3. Therefore, the first electrode 15 is liable to relatively become higher than the second electrode 16 in temperature. As described above, the first electrode 15 on the auxiliary mirror 3 side is liable to become higher than the second electrode 16 in temperature, and thus the deterioration rate of the first electrode 15 is increased. For this reason, as described above, when the displacement ΔI/2 which is a degree of unevenness of the AC current supplied between the first and second electrodes 15 and 16 is cyclically changed, the maximum value DM1 of the displacement ΔI/2 when the first electrode 15 serves as an anode is set so as to be smaller than the maximum value DM2 of the displacement ΔI/2 when the second electrode 16 serves as an anode, the rise in temperature of the first electrode 15 on the auxiliary mirror 3 side is suppressed. Specifically, the maximum value DM1 of the displacement ΔI/2 on the first electrode 15 side is set to about 20% of the AC component of the lighting frequency, and the maximum value DM2 of the displacement ΔI/2 on the second electrode 16 side is set to about 30% of the AC component of the lighting frequency. Therefore, the first electrode 15 on the auxiliary mirror 3 side can be prevented from wearing off unevenly, while the luminance of the arc AR can be ensured.

The fact that the maximum value DM1 of the displacement ΔI/2 when the first electrode 15 serves as an anode is set so as to be smaller than the maximum value DM2 of the displacement ΔI/2 when the second electrode 16 serves as an anode means that the maximum value (maximum anode current) of the absolute value I1 of the current value when the first electrode 15 serves as an anode is set so as to be smaller than the maximum value (maximum anode current) of the absolute value I2 of the current value when the second electrode 16 serves as an anode.

Figure 5A:
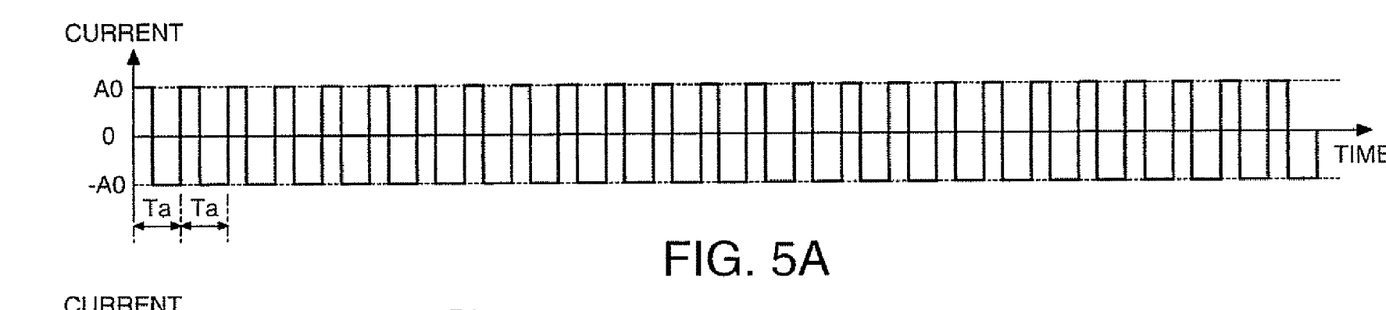
FIGS. 5A to 5C are diagrams illustrating the waveform of an AC current to be supplied to both electrodes.
Figure 5B:
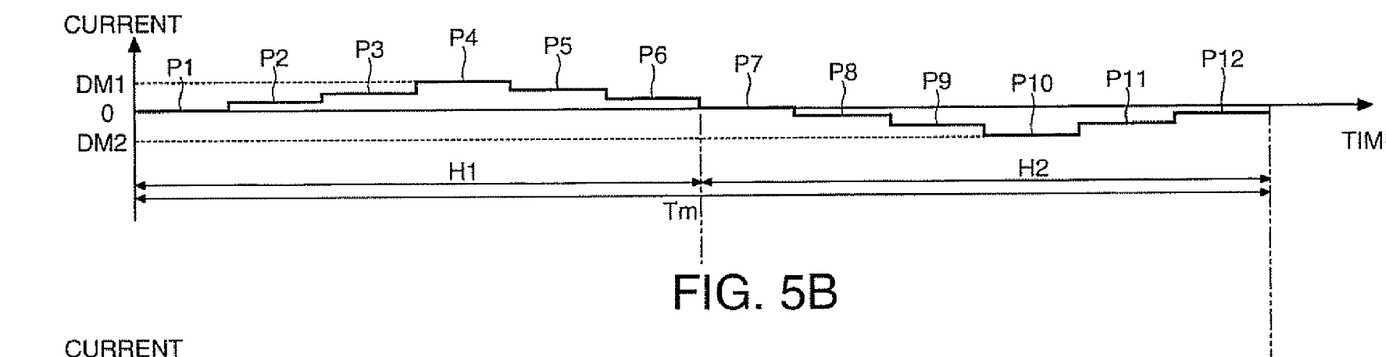
Figure 5C:
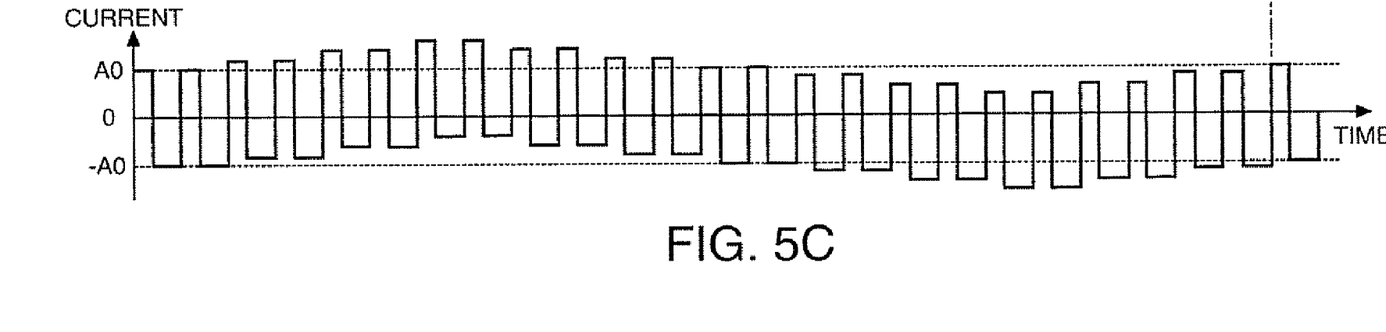

FIGS. 5A to 5C are graphs illustrating the AC current to be supplied to a pair of electrodes 15 and 16. In each graph, the horizontal axis represents a time, and the vertical axis represents a current value. FIG. 5A shows an AC component for lighting between both electrodes 15 and 16. This AC component is a square wave having a predetermined cycle Ta corresponding to a lighting frequency, and has the same positive and negative amplitudes ±A0 corresponding to a current value A0. FIG. 5B shows the displacement ΔI/2 corresponding to a DC component to be superimposed on an AC component shown in FIG. 5A. The displacement ΔI/2 changes in a stepwise manner and cyclically increases or decreases in a cycle Tm. The cycle Tm includes a first half cycle H1 in which the anode current of the first electrode 15 on the auxiliary mirror 3 side relatively becomes large, and a second half cycle H2 in which the anode current of the second electrode 16 on the reflector 2 side relatively becomes large. The displacement ΔI/2 as the DC component changes at 12 levels in total of 6 division periods P1 to P6 in the first half cycle H1 in which the anode current of the first electrode 15 relatively becomes large, and 6 division periods P7 to P12 in the second half cycle H2 in which the anode current of the second electrode 16 relatively becomes large. In this case, while the maximum value DM1 (a DC current value of a division period P4) of the anode current during the first half cycle H1 in which the first electrode 15 serves as an anode is 20% of the AC component as described above, the maximum value DM2 (a DC current value of a division period P10) of the anode current during the second half cycle H2 in which the second electrode 16 serves as an anode is 30% as described above. That is, the displacement ΔI/2 corresponding to the DC component when the second electrode 16 serves as an anode is set so as to be smaller than the displacement ΔI/2 corresponding to the DC component when the first electrode 15 serves as an anode. FIG. 5C shows a current waveform generated by superimposing the displacement ΔI/2 of FIG. 5B on the AC component of FIG. 5A. The AC current is supplied to both electrodes 15 and 16, and the displacement ΔI/2 corresponding to the DC component slowly changes to be positive or negative in a comparatively long cycle. In addition, the maximum anode current of the first electrode 15 is set so as to be smaller than the maximum anode current of the second electrode 16. Therefore, the first and second electrodes 15 and 16 can be prevented from wearing off unevenly while the repair process is performed, and the relative rise in temperature of the first electrode 15 on the auxiliary mirror 3 side can be suppressed.

In the case of an operation pattern including one other than the displacement regarding the relative difference ΔI of the current waveform shown in FIGS. 5A to 5C, it is not necessary to maintain the lighting frequency of the current to be supplied to both electrodes 15 and 16 or the duty ratio, and different lighting frequencies or current values may be allocated to the division periods P1, P2, P3, . . . .

In the case of an operation pattern including one other than the displacement regarding the relative difference ΔI shown in FIGS. 5A to 5C, the set values of the lighting frequency, the current value, the current displacement (specifically, the range of the displacement ΔI/2 of the driving waveform), the division period, the current displacement cycle, and the like can be increased or decreased on the basis of information regarding a deterioration level obtained by the determination section 75, for example, how both electrodes 15 and 16 wear off. For example, when both electrodes 15 and 16 wear off, the lighting frequency and the current value are temporarily increased or decreased, thereby maintaining the shapes of the tip portions 15a and 16a of both electrodes 15 and 16. In addition, by increasing the maximum current value, that is, the range of the displacement ΔI/2, the electrodes which are deteriorated in a time-variant manner can be reliably melted, and the shapes of the tips can be favorably maintained.

Figure 6A:
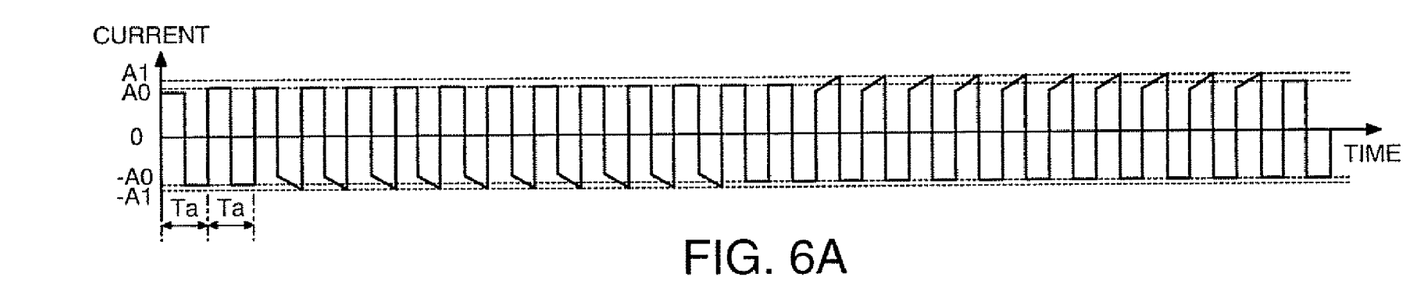
FIGS. 6A to 6C are diagrams illustrating a modification of an AC current to be supplied to both electrodes.
Figure 6B:
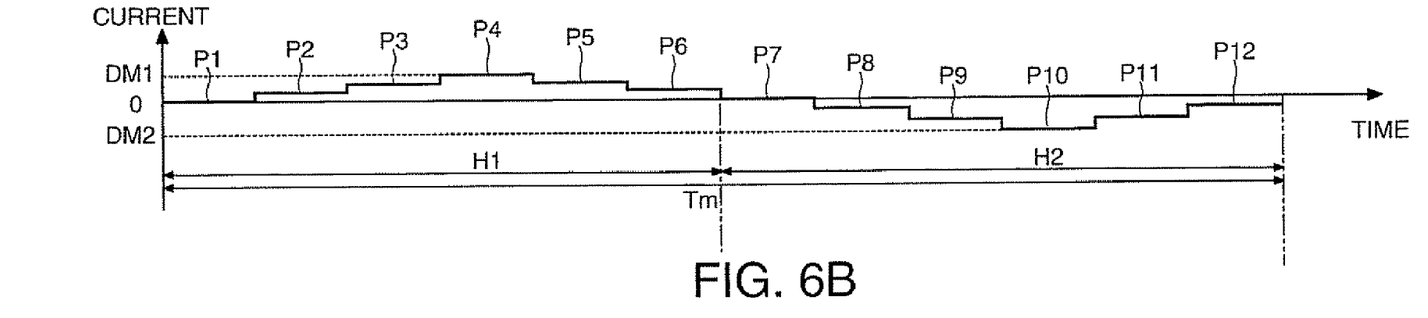
Figure 6C:
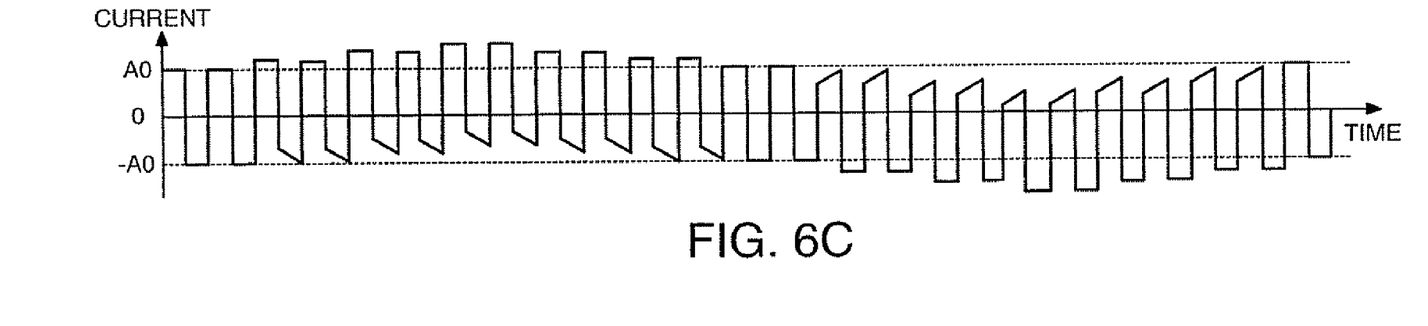

FIGS. 6A to 6C are graphs illustrating a modification of the AC current shown in FIGS. 5A to 5C. FIG. 6A shows an AC component for lighting both electrodes 15 and 16. FIG. 6B shows a displacement ΔI/2 corresponding to a DC component which is superimposed on the AC component of FIG. 6A. FIG. 6C shows a current waveform in which the displacement ΔI/2 shown in FIG. 6B is superimposed on the AC component shown in FIG. 6A. In this case, it is common to the original AC current in that each time the division periods P1, P2, P3, . . . are switched, the DC component, that is, the displacement ΔI/2 changes in a stepwise manner. Meanwhile, of the positive and negative polarities per cycle of the AC current, at a polarity when the absolute value of the current value becomes small, the driving waveform is changed. That is, when the second electrode 16 serves as an anode in the first half cycle H1, and when the first electrode 15 serves as an anode in the second half cycle H2, a superimposed wave generated by superimposing a gradually increasing triangular wave on a square wave is supplied. The average current value of the AC component before being superimposed is maintained to A0, and the peak value is set to A1. Here, let the ratio of the peak value A1 to the average current value A0 be a triangular wave jump rate of the superimposed wave, and the triangular wave jump rate A1/A0 increases so as to be larger than the triangular wave jump rate 1 of the square wave. With the adjustment of the triangular wave jump rate, the tip of the anode can be sufficiently melted, and flicker in the cathode can be suppressed.

Figure 7:
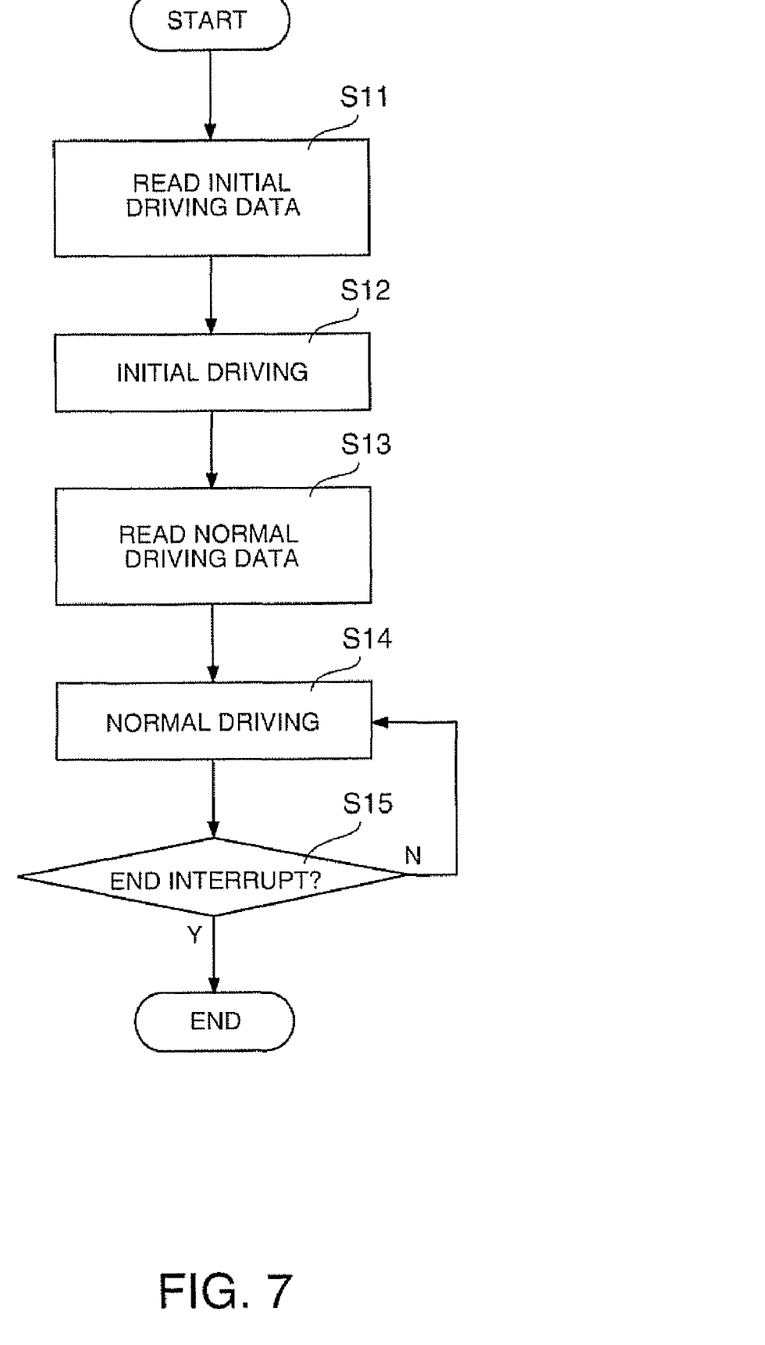
FIG. 7 is a flowchart illustrating the operation of a light source driving device.

FIG. 7 is a flowchart illustrating the operation of the light source driving device 70. The control device 70b reads out adequate initial driving data necessary for starting to turn on the light-emitting tube 1 from a driving control table stored in the data storage section 76 (Step S11).

Next, the control device 70b controls the lighting device 70a on the basis of a power feed condition for an initial operation read in Step S11, and controls the initial operation including initiation and rising of the light-emitting tube 1 (Step S12).

Next, the control device 70b reads out adequate normal driving data necessary for maintaining the emission state of the light-emitting tube 1 from the driving control table stored in the data storage section 76 (Step S13). Specifically, the set values of the lighting frequency, the current value, the current displacement (specifically, the range of the displacement ΔI/2 of the driving waveform), the division period, the current displacement cycle, the triangular wave jump rate, and the like during the steady operation are read out. In this case, a lighting waveform, such as the lighting frequency, the current value, and the like, and a driving pattern or a displacement pattern including the current displacement (specifically, the range of the displacement ΔI/2 of the driving waveform), the division period, the current displacement cycle, and the like is selected on the basis of information regarding a deterioration level obtained by the determination section 75, for example, how both electrodes 15 and 16 wear off.

Next, the control device 70b controls the steady operation of the light-emitting tube 1 of the lighting device 70a on the basis of a power feed condition for a steady operation read in Step S13 (Step S14). A specific operation is illustrated in FIGS. 4A to 4C, and 5A to 5C.

The determination section 75 determines whether or not an interrupt request signal for requesting the end of the lighting operation of the light source unit 10 is input during the steady operation (Step S15). When the interrupt request signal is input, information regarding the current state of the light-emitting tube 1, such as a current cumulative lighting time, a voltage being currently supplied to the light-emitting tube 1, and the like, is recorded in the data storage section 76, and then a lighting-out operation is executed.

As will be apparent from the foregoing description, according to the light source device 100 of this embodiment, during the steady operation in which the light-emitting tube 1 is in rated operation, the relative difference ΔI, which corresponds to the difference between the absolute values of the current values, for the two polarities during one cycle of the AC current or the displacement ΔI/2 for realizing the relative difference as the DC component is changed in accordance with the predetermined pattern by the lighting device 70a that operates under the control of the control device 70b. For this reason, even if the AC current whose polarity alternates is basically used, the balance of the maximum current value when the first electrode 15 serves as an anode and the maximum current value when the second electrode 16 serves as an anode can be appropriately changed. Therefore, the tip portions 15a and 16a as a single large protrusion can be reliably maintained or grown while the tip portions 15a and 16a of both electrodes 15 and 16 are appropriately melted alternately. As a result, both electrodes can be prevented from being deteriorated, and thus the lifespan of the light source can be extended.

Figure 8:
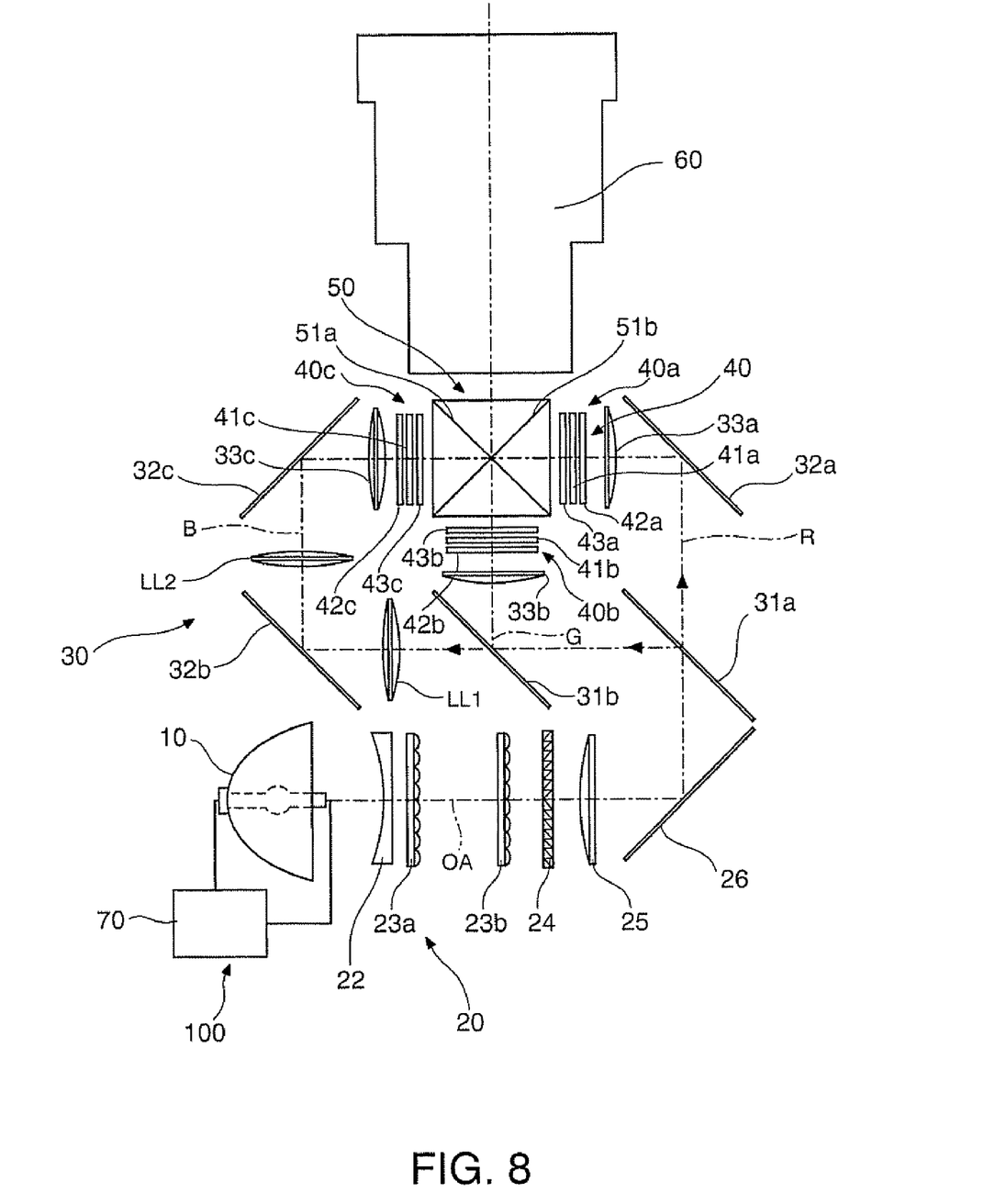
FIG. 8 is a diagram illustrating a projector incorporated with a light source device.

FIG. 8 is a conceptual view illustrating the structure of a projector incorporated with the light source device 100 of FIG. 1. A projector 200 includes a light source device 100, an illumination optical system 20, a color separation optical system 30, a light modulation section 40, a cross dichroic prism 50, and a projection lens 60. The light modulation section 40 includes three liquid crystal light valves 40a, 40b, and 40c having the same structure.

In the projector 200, the light source device 100 includes the light source unit 10 and the light source driving device 70 shown in FIG. 1. The light source device 100 generates illumination light for illuminating the light modulation section 40, that is, the liquid crystal light valves 40a, 40b, and 40c, through the illumination optical system 20.

The illumination optical system 20 includes a parallelizing lens 22 that parallelizes the direction of a light beam emitted from the light source, first and second fly-eye lenses 23a and 23b that constitute an integrator optical system for dividing light into partial light beams and superimposing the partial light beams, a polarization conversion element 24 that arranges the light polarization direction, a superimposing lens 25 that superimposes light having passed through both fly-eye lenses 23a and 23b, and a mirror 26 that bends the optical path of light. In the illumination optical system 20, the parallelizing lens 22 converts the light beam direction of illumination light emitted from the light source unit 10 into substantially parallel light. The first and second fly-eye lenses 23a and 23b each include a plurality of element lenses arranged in a matrix. The element lenses constituting the first fly-eye lens 23a divide light having passed through the parallelizing lens 22 into partial light beams, and collect the partial light beams separately. The element lenses constituting the second fly-eye lens 23b convert the partial light beams from the first fly-eye lens 23a into light beams having an appropriate divergence angle. The polarization conversion element 24 has an array of PBS, mirror, retardation film, and the like as a set of elements, and has a function of converting the partial light beams divided by the first fly-eye lens 23a into one-directional linear polarized light. The superimposing lens 25 appropriately converges illumination light having passed through the polarization conversion element 24 as a whole such that illumination light can be superimposed on regions to be illuminated of the liquid crystal light valves 40a, 40b, and 40c of a subsequent stage as light modulation devices for respective colors. That is, illumination light having passed through both fly-eye lenses 23a and 23b and the superimposing lens 25 passes through the color separation optical system 30, which will be described below in detail, and is superimposed and uniformly illuminates liquid crystal panels 41a, 41b, and 41c for respective colors provided in the light modulation section 40.

The color separation optical system 30 includes first and second dichroic mirrors 31a and 31b, reflecting mirrors 32a, 32b, 32c, and three field lenses 33a, 33b, and 33c. The color separation optical system 30 separates illumination light from the illumination optical system 20 into three color light components of red (R), green (G), and blue (B), and introduces the color light components to the liquid crystal light valves 40a, 40b, and 40c of a subsequent stage, respectively. More specifically, first, the first dichroic mirror 31a transmits the R light component of the three R, G, and B light components, and reflects the G and B light components. The second dichroic mirror 31b reflects the G light component of the two G and B light components, and transmits the B light component. Next, in the color separation optical system 30, the R light component having passed through the first dichroic mirror 31a passes through the reflecting mirror 32a and enters the field lens 33a for controlling the incident angle. The G light component reflected by the first dichroic mirror 31a and further reflected by the second dichroic mirror 31b enters the field lens 33b for controlling the incident angle. The B light component having passed through the second dichroic mirror 31b passes through relay lenses LL1 and LL2 and the reflecting mirrors 32b and 32c, and enters the field lens 33c for controlling the incident angle.

The liquid crystal light valves 40a, 40b, and 40c constituting the light modulation section 40 are non-emission-type light modulation devices for modulating the spatial intensity distribution of incident illumination light. The liquid crystal light valves 40a, 40b, and 40c include three liquid crystal panels 41a, 41b, and 41c that correspondingly receive the color light components emitted from the color separation optical system 30, three first polarizing filters 42a, 42b, and 42c that are disposed on the incident sides of the liquid crystal panels 41a, 41b, and 41c, respectively, and three second polarizing filters 43a, 43b, and 43c that are disposed on the emission sides of the liquid crystal panels 41a, 41b, and 41c, respectively. The R light component having passed through the first dichroic mirror 31a enters the liquid crystal light valve 40a through the field lens 33a to illuminate the liquid crystal panel 41a of the liquid crystal light valve 40a. The G light component reflected by the first and second dichroic mirrors 31a and 31b enters the liquid crystal light valve 40b through the field lens 33b to illuminate the liquid crystal panel 41b of the liquid crystal light valve 40b. The B light component having been reflected by the first dichroic mirror 31a and passed through the second dichroic mirror 31b enters the liquid crystal light valve 40c through the field lens 33c to illuminate the liquid crystal panel 41c of the liquid crystal light valve 40c. The liquid crystal panels 41a to 41c modulate the spatial intensity distribution of incident illumination light in the polarization direction to control the polarization states of the three color light components having entered the liquid crystal panels 41a to 41c for each pixel in accordance with driving signals or image signals input as electrical signals to the liquid crystal panels 41a to 41c. In this case, the first polarizing filters 42a to 42c control the polarization direction of illumination light entering the liquid crystal panels 41a to 41c, respectively. The second polarizing filters 43a to 43c extract modulated light having a predetermined polarization direction from modulated light emitted from the liquid crystal panels 41a to 41c. In this way, the liquid crystal light valves 40a, 40b, and 40c form image light for the respective colors.

The cross dichroic prism 50 synthesizes image light for the respective colors from the liquid crystal light valves 40a, 40b, and 40c. More specifically, the cross dichroic prism 50 has a substantially square shape in plan view formed by affixing four rectangular prisms, and a pair of dielectric multilayer films 51a and 51b crossing in an X shape are formed on the boundaries of the affixed rectangular prisms. The first dielectric multilayer film 51a reflects the R light component, and the second dielectric multilayer film 51b reflects the B light component. The cross dichroic prism 50 reflects the R light component from the liquid crystal light valve 40a by the dielectric multilayer film 51a so as to be emitted to the right with respect to the travel direction. The cross dichroic prism 50 directs the G light component from the liquid crystal light valve 40b so as to advance straight and to be emitted through the dielectric multilayer films 51a and 51b. The cross dichroic prism 50 reflects the B light component from the liquid crystal light valve 40c by the dielectric multilayer film 51b so as to be emitted to the left with respect to the travel direction. In this way, the cross dichroic prism 50 synthesizes the R, G, and B light components to produce synthesized light as image light for forming a color image.

The projection lens 60 is a projection optical system which enlarges image light on a desired scale of enlargement as synthesized light from the cross dichroic prism 50, and projects a color image onto a screen (not shown).

According to the projector 200, a pair of electrodes 15 and 16 constituting the light source device 100 can be alternately repaired, and one of the pair of electrodes 15 and 16 can be prevented from being deteriorated unevenly and early. Therefore, the projection luminance of the projector 200 can be maintained over a long period.

Second Embodiment

Hereinafter, a light source device of a second embodiment will be described. The light source device of the second embodiment is a modification of the light source device 100 of the first embodiment. It should be noted that portions not specifically described are the same as those in the light source device 100 of the first embodiment.

Though not shown, the light source device 100 of the second embodiment has a configuration in which the auxiliary mirror 3 is not provided in the light source unit 10 of FIG. 1. For this reason, in the case of the light source device 100 of this embodiment, one electrode of the first electrode 15 and the second electrode 16 does not tend to become higher than the other electrode in temperature.

Figures 9A, 9B:
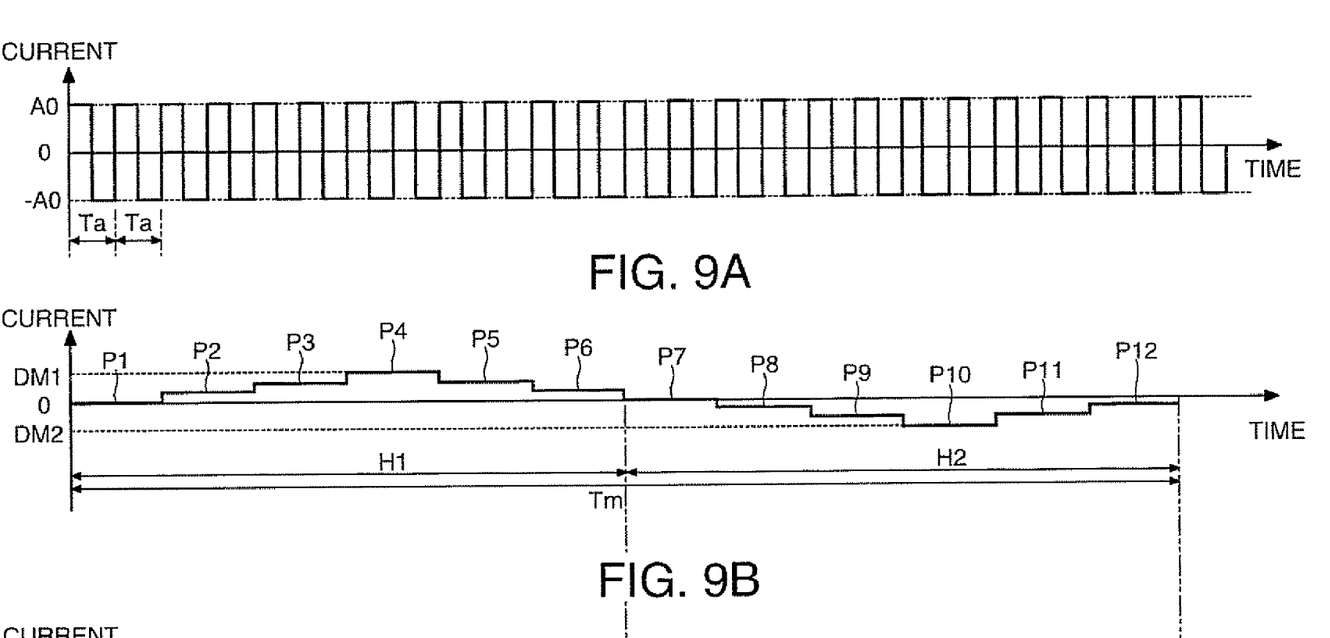
FIGS. 9A to 9C are diagrams illustrating the operation of a light source device according to a second embodiment.
Figure 9C:
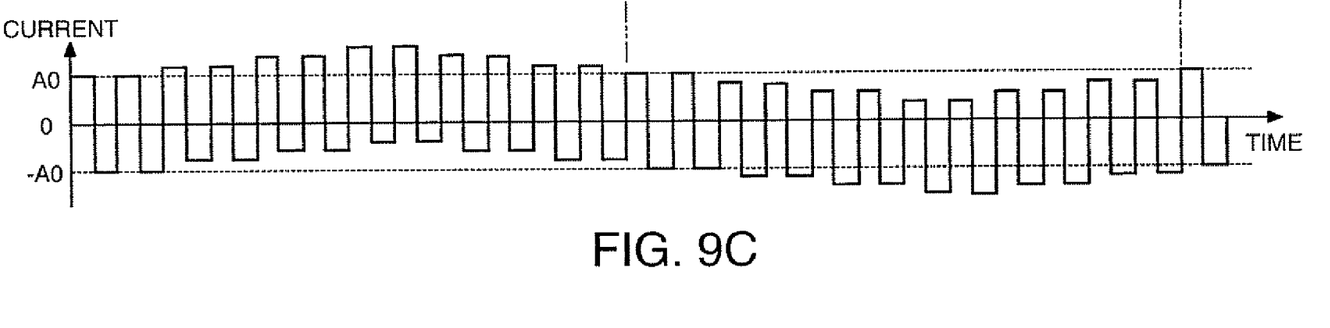

FIGS. 9A to 9C are graphs illustrating an AC current to be supplied to a pair of electrodes 15 and 16 provided in the light source device 100 of the second embodiment. FIG. 9A shows an AC component for lighting both electrodes 15 and 16. FIG. 9B shows a displacement $\Delta I/2$ corresponding to a DC component which is superimposed on the AC component of FIG. 9A. FIG. 9C shows an AC current in which the displacement $\Delta I/2$ of FIG. 9B is superimposed on the AC component of FIG. 9A. In this case, it is common to the first embodiment in that each time the division periods P1, P2, P3, . . . are switched, the DC component, that is, the displacement $\Delta I/2$ is changed in a stepwise manner. Meanwhile, the maximum anode current DM1 of the first electrode 15 is set so as to be identical to the maximum anode current DM2 of the second electrode 16. In this case, the first and second electrodes 15 and 16 can also be prevented from wearing off unevenly while the repair process is performed. Here, it should be noted that the first electrode 15 and the second electrode 16 are at the substantially same temperature.

Figure 10A:
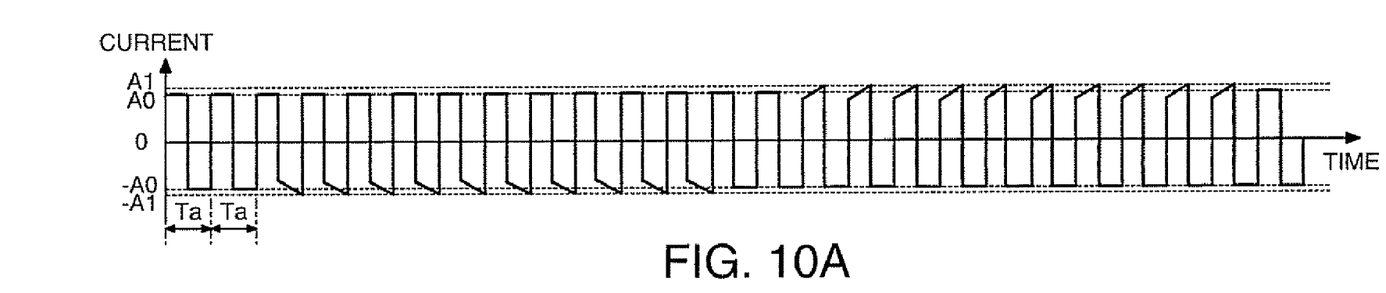
FIGS. 10A to 10C are diagrams illustrating the operation of a modification of the second embodiment.
Figure 10B:
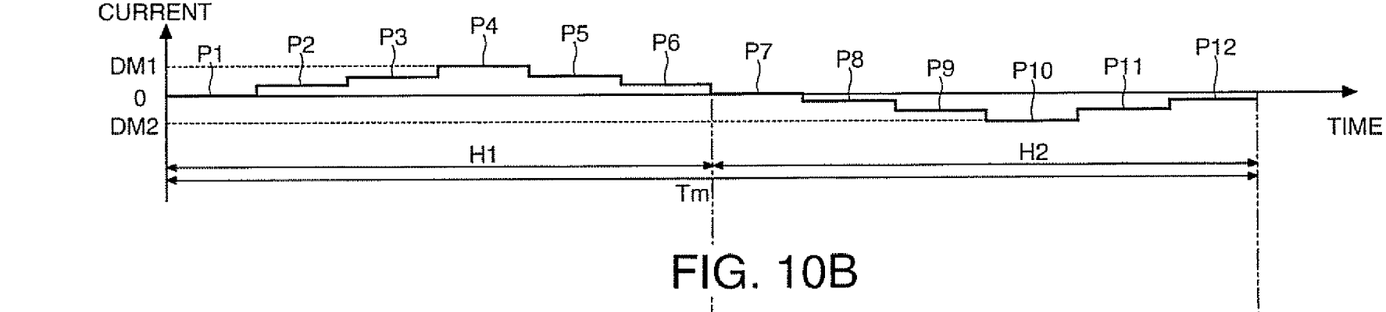
Figure 10C:
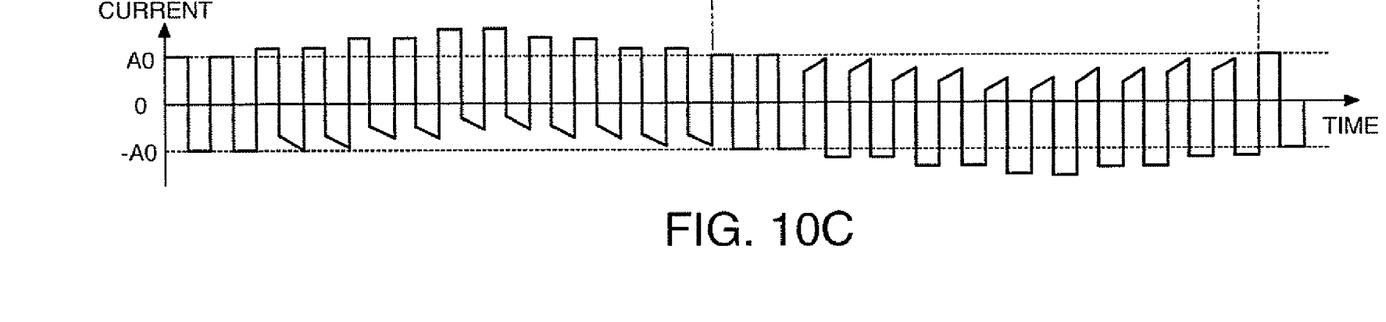

FIGS. 10A to 10C are illustrating a modification of the AC current shown in FIGS. 9A to 9C. FIG. 10A shows an AC component for lighting both electrodes 15 and 16. FIG. 10B shows a displacement $\Delta I/2$ corresponding to a DC component which is superimposed on the AC component of FIG. 10A. FIG. 10C shows an AC current in which the displacement $\Delta I/2$ of FIG. 10B is superimposed on the AC component of FIG. 10A. In this case, it is common to the original AC current in that each time the division periods P1, P2, P3, . . . are switched, the DC component, that is, the displacement $\Delta I/2$ is changed in a stepwise manner. Meanwhile, of the positive and negative polarities per cycle of the AC current, at a polarity when the absolute value of the current value becomes small, that is, when the second electrode 16 serves as an anode in the first half cycle H1 and the first electrode 15 serves as an anode in the second half cycle H2, a superimposed wave generated by superimposing a gradually increasing triangular wave on a square wave is supplied. With the adjustment of the triangular wave jump rate of the triangular wave, the tip of the anode can be sufficiently melted, and flicker in the cathode can be suppressed.

The invention is not limited to the foregoing embodiment, but various modifications may be made without departing from the scope of the invention. For example, the following modifications may be made.

For example, the displacement patterns shown in FIGS. 4A to 4C, FIGS. 5A to 5C, 9A to 9C, and 10A to 10C are just examples, and an AC current to be supplied to a pair of electrodes 15 and 16 may be changed in accordance with various displacement patterns. In this case, the convection AF can be prevented from being excessively localized inside the light-emitting tube 1 while the first and second electrodes 15 and 16 can be repaired.

In the second embodiment, a case in which the auxiliary mirror 3 is provided, and accordingly no difference in temperature occurs between the first electrode 15 and the second electrode 16 has been described. Even if no auxiliary mirror 3 is provided, in an air-cooled state, a difference in temperature may occur between both electrodes 15 and 16, or if both electrodes 15 and 16 are different in size, a difference in temperature may occur between both electrodes 15 and 16. In this case, by using the waveforms shown in FIGS. 5A to 5C or 6A to 6C, current driving can be achieved with the difference in temperature between both electrodes 15 and 16 compensated.

Referring to the operation of FIGS. 6A to 6C in the first embodiment or the operation of FIGS. 10A to 10C in the second embodiment, of the positive and negative polarities per cycle of the AC current, at a polarity at which the absolute value of the current value becomes small, a superimposed wave generated by superimposing a gradually increasing triangular wave on a square wave is supplied. Alternatively, in addition to a polarity at which the absolute value of the current value becomes small, at a polarity at which the absolute value of the current value becomes large, a superimposed wave with a triangular wave superimposed may be supplied.

As the lamp for the light source unit 10 of the foregoing embodiment, various kinds of lamps, such as a high-pressure mercury lamp or a metal halide lamp, may be used.

In the projector 200 of the foregoing embodiment, in order to separate light from the light source device 100 into a plurality of partial light beams, a pair of fly-eye lenses 23a and 23b are used, but the invention may be applied to a projector in which no fly-eye lens, that is, no lens array is used. In addition, the fly-eye lenses 23a and 23b may be substituted with a rod integrator.

The projector 200 uses the polarization conversion element 24 that converts light from the light source device 100 into polarized light in a specific direction, but the invention may be applied to a projector in which no polarization conversion element 24 is used.

In the foregoing embodiment, an example where the invention is applied to a transmission type projector has been described, but the invention may be applied to a reflection type projector. The term "transmission type" herein means a liquid crystal light valve including a liquid crystal panel and the like transmits light, and the term "reflection type" means that a liquid crystal light valve reflects light. The light modulation device is not limited to a liquid crystal panel. For example, a light modulation device using a micro mirror may be used.

There are a front type projector that projects an image from the projection surface viewing side, and a rear type projector that projects an image from the side opposite to the projection surface viewing side. The configuration of the projector shown in FIG. 8 may be applied to both types.

In the foregoing embodiment, only an example of the projector 200 which uses the three liquid crystal panels 41a to 41c has been described, but the invention may be applied to a projector which uses a single liquid crystal panel, a projector which uses two liquid crystal panels, or a projector which uses four or more liquid crystal panels.

In the foregoing embodiment, the color light components are modulated by using the color separation optical system 30 and the liquid crystal light valves 40a, 40b, and 40c. Alternatively, the color light components may be modulated and synthesized by using a combination of a color wheel which is illuminated by the light source device 100 and the illumination optical system 20, and a device which includes pixels of micro mirrors and onto which light having passed through the color wheel is irradiated.

The entire disclosure of Japanese Patent Application No. 2008-36973, filed Feb. 19, 2008 is expressly incorporated by reference herein.

What is claimed is:

1. A method for driving a discharge lamp that supplies an AC current to a discharge lamp having a first electrode and a second electrode so as to produce discharge and to cause the discharge lamp to emit light, the method comprising:

during a steady operation in which the AC current is supplied to the discharge lamp, changing a difference between the absolute values of current values for two polarities during one cycle of the AC current in accordance with a predetermined pattern.

2. The method according to claim 1, wherein a period of one cycle of the predetermined pattern corresponds to a period of a plurality of cycles of the AC current, during one cycle of the predetermined pattern, the difference between the absolute values of average current values during half cycle for the two polarities increases or decreases, and the difference between the absolute values of the average current values during half cycle for the two polarities is cyclically changed by repetition of the predetermined pattern.

3. The method according to claim 1,
wherein, in a situation where a tip portion of the first electrode becomes higher than a tip portion of the second electrode in temperature, the maximum value of the absolute value of the current value when the first electrode operates as an anode is set so as to be smaller than the maximum value of the absolute value of the current value when the second electrode operates as an anode.

4. The method according to claim 1,
wherein a primary reflecting mirror is disposed on the second electrode side to reflect a light beam generated by discharge between the first electrode and the second electrode so as to be emitted toward a region to be illuminated, and an auxiliary reflecting mirror is disposed on the first electrode side so as to be opposite the primary reflecting mirror to reflect a light beam from an inter-electrode space between the first electrode and the second electrode toward the inter-electrode space.

5. The method according to claim 1,
wherein the current value of at least one polarity, at which the absolute value of the current value becomes smaller, of the two polarities during one cycle of the AC current is changed within a corresponding polarity period.

6. The method according to claim 5,
wherein the current value of at least one polarity, at which the absolute value of the current value becomes smaller, of the two polarities during one cycle of the AC current is changed such that the absolute value of the current value is maximized at the end of a corresponding polarity period.

7. A projector comprising:
a light source device that is driven by the driving method according to claim 1 and emits light;
a light modulation device that receives a light beam from the light source device; and
a projection optical system that projects an image formed by the light modulation device.

8. A projector comprising:
a light source device that is driven by the driving method according to claim 2 and emits light;
a light modulation device that receives a light beam from the light source device; and
a projection optical system that projects an image formed by the light modulation device.

9. A projector comprising:
a light source device that is driven by the driving method according to claim 3 and emits light;
a light modulation device that receives a light beam from the light source device; and
a projection optical system that projects an image formed by the light modulation device.

10. A projector comprising:
a light source device that is driven by the driving method according to claim 4 and emits light;
a light modulation device that receives a light beam from the light source device; and
a projection optical system that projects an image formed by the light modulation device.

11. A projector comprising:
a light source device that is driven by the driving method according to claim 5 and emits light;
a light modulation device that receives a light beam from the light source device; and
a projection optical system that projects an image formed by the light modulation device.

12. A projector comprising:
a light source device that is driven by the driving method according to claim 6 and emits light;
a light modulation device that receives a light beam from the light source device; and
a projection optical system that projects an image formed by the light modulation device.

13. A driving device that supplies an AC current to a discharge lamp having a first electrode and a second electrode so as to produce discharge and to cause the discharge lamp to emit light, the driving device comprising:
a current driving circuit that, during a steady operation in which the AC current is supplied to the discharge lamp, changes a difference between the absolute values of current values for two polarities during one cycle of the AC current in accordance with a predetermined pattern.

* * * * *